United States Patent Office 3,188,350
Patented June 8, 1965

3,188,350
VAPOR PHASE PREPARATION OF ALLYL-SUBSTITUTED KETONES
George R. Martin, Freeport, and Nicholas B. Lorette, Lake Jackson, Tex., assignors to The Dow Chemical Company, Midland, Mich., a corporation of Delaware
No Drawing. Filed May 5, 1961, Ser. No. 107,909
1 Claim. (Cl. 260—586)

This invention relates to a new and useful process for making unsaturated ketones. More particularly it concerns a process by which hydrogens on the alpha carbon atoms of ketones can be replaced by allylic groups.

Due to the difficulty experienced in the prior art of preparing these allylated ketones, this class of compounds has been little used. In the art it is known that heating allyl vinyl ethers will cause rearrangement to form allyl-substituted aldehydes and ketones. Diallyl acetals of aldehydes also have been shown to convert to allyl-substituted aldehydes by pyrolysis. It is also known that alkenyl-substituted unsaturated aldehydes can be made by the direct reaction of unsaturated aldehydes with unsaturated alcohols at elevated temperatures. However, the reaction of an unsaturated alcohol with the ketone in place of aldehyde does not go to an appreciable extent with or without catalyst. Until recently diallyl ketals have not been readily obtainable. Those which are known undergo the same cracking and rearrangement reactions as the diallyl acetals.

It is an object of this invention to provide a process for preparing alpha-allyl-substituted ketones. It is another object to provide a simple, one-step method to produce allyl ketones which makes use of readily available materials. A further object is to provide a process which does not require the use of the diallyl ketal. Yet another object is to provide a process which is easily controlled, can be operated at atmospheric pressures, and, is reproducible. A still further object of this invention is to provide catalysts for this process which will give good product yield at high conversion of reactants. These and other objects will become apparent to those skilled in the art from the following description and claim.

It has now been found that a lower dialkyl ketal of an aliphatic or cycloaliphatic ketone (alkanone or cycloalkanone) can be reacted with allyl alcohol by heating the reactants in the vapor phase in the presence of a suitable catalyst to form directly, in a single step, an alpha-allyl-substituted ketone.

In accordance with the present invention allyl alcohol is reacted with a lower dialkyl ketal of an aliphatic or cycloaliphatic ketone (alkanone or cycloalkanone) in the vapor phase in the presence of an inorganic (dehydration) catalyst.

It is to be understood that both mono- and poly-substituted alpha-allyl ketones are obtained from this reaction. However, it appears that the higher feed rates of reactants per unit of catalyst favor the formation of the mono-substituted product. Thus, at a feed rate of 30 ml. per hour per 100 cc. of catalyst a considerable amount of the disubstituted product can be obtained, while at rates of 75 to 100 ml. per hour substantially none of the di- or poly-substituted product is obtained.

In a preferred embodiment of our invention a vaporous mixture of about five moles of allyl alcohol to about one mole of a ketal is passed through a reactor containing a catalyst bed of calcium-nickel phosphate and chromia, maintained at about 225° to about 400° C. The mixture is preferably fed at the rate of from about 20 to about 100 ml. per hour per 100 cc. of catalyst. The conversion of ketal is substantially theoretical.

In like manner many lower dialkyl ketals of aliphatic and cycloaliphatic ketones (alkanones and cycloalkanones) can be reacted with allyl alcohol to yield alpha-allyl-substituted ketones.

The compounds prepared by the process of the present invention are useful intermediates and solvents. For example, the alpha-n-propyl-substituted ketones may be prepared by hydrogenating the allyl groups of the ketone products of the instant invention. Allyl acetone is an intermediate in the process for making the synthetic pyrethrins. Diepoxides, which are useful crosslinking agents in polymers, can be prepared from the diallyl ketone products of the instant process. As solvents, the products of the present invention are unique in that they contain both a carbonyl group and one or more carbon-carbon double bonds.

The reaction can be conducted generally in the temperature range of from about 175° to about 475° C. Below about 175° C. conversion becomes very poor and most of the reactants pass through the tube unchanged. Above about 475° C. by-products are formed, lowering the yield of desired product. The temperature range preferred in the practice of this invention is from about 225° to about 400° C.

The operable range of molecular proportions of reactants is from about 0.2 to 20 moles of alcohol per mole of ketal. If the proportion of ketal to alcohol exceeds about five to one, the yields of desired product are reduced and by-products resulting from the cracking of the ketal become predominant. On the other hand, if the proportion of alcohol is increased beyond the upper limit, the reaction becomes uneconomical because of recycling a large amount of alcohol and removing it from the desired product ketone. The preferred molecular ratio range of alcohol to ketal is from about one to one to about 15 to one, respectively.

Suitable ketals are those derived from aliphatic ketones (alkanones) containing from three to eight carbon atoms and cycloaliphatic ketones (cycloalkanones) containing five and six membered carbon rings, and from lower alkanols having from one to four carbon atoms. Thus, ketals such as acetone dimethyl, acetone diethyl, acetone dipropyl and acetone dibutyl ketals can be reacted with allyl alcohol. Likewise the dimethyl, diethyl, dipropyl, dibutyl and the like ketals of ketones such as butanone, 2-pentanone, 3-pentanone, 2-hexanone, 3-hexanone, cyclopentanone, cyclohexanone, 2-methyl-3-butanone, 2-methyl-3-pentanone, 2,4-dimethyl-3-pentanone, octanones, and the like are useful in the instant process.

It is essential to the operation of our process that the dialkyl ketal is derived from an aliphatic ketone having at least one hydrogen atom on one of the alpha-carbons attached to the carbonyl group. If there is only one alpha-hydrogen, the monoallyl ketone is the only product obtained. With two or more alpha-hydrogens it is possible to obtain additionally di- or poly-allyl products. The variables already mentioned—catalysts, feed rate, temperature, and reactant ratio—affect the composition of the product mixture.

The catalysts which are useful in the process are the metals gold, silver, platinum, cobalt, and nickel as well as the other metals of Groups IB and VIII of the Periodic Table of the Elements. The oxides of certain metals, notably those of Group IIB of the Periodic Table and of chromium, and manganese, also catalyze the reaction, as do the chlorides of the metals in Groups IB, IIA, IIIA, and VIII, and cadmium, zirconium, antimony, and chromium chlorides and aluminum fluoride. Other catalysts, also suitably supported, include the sulfates of metals of Groups IA and IIA and of lanthanum, cerium, gadolinium and thorium and of aluminum, thallium, zirconium, antimony, manganese, and nickel; the phosphates of metals which are catalytic for this reaction include the phosphates of metals of Groups IA, IIA, and IVA, and of silver, cadmium, lanthanum, cerium, thorium, aluminum, thallium, tin, chromium, manganese, iron and gadolinium.

The catalyst can be supported on substantially any of many types of supports known to the art. However, it is preferred to use a granular alumina in those cases in which the form of the catalyst requires a support. If the catalytic material itself can be made into a strong, self-adherent granular mass, no support is needed.

Most of the metals and metal salts are used as supported catalysts on supports such as alumina, silicon carbide, aluminum silicate, pumice, unglazed porcelain and the like. Of the catalysts in granular form which need no support may be mentioned, aluminum phosphate and nickel-aluminum phosphate. To obtain some of the catalysts it was only necessary to treat the surface of an alumina support with an acid. Supports obtained in this way included a clay support treated with phosphoric acid, and an alumina support treated with hydrofluoric acid.

Our invention is illustrated and applied in the following examples, but is not to be construed as limited thereby.

EXAMPLE 1

A mixture of 92 g. of allyl alcohol (ca. 1.6 mol) and 328 g. of acetone dimethyl ketal (ca. 3.4 mol) was fed by means of a stream of nitrogen gas, through a tube which contained 100 cc. of calcium-nickel phosphate and chromia granular catalyst prepared in accordance with U.S. Patent No. 2,456,368. The reaction was maintained at a temperature of about 279° C. The rate of feeding the gas stream was such as to use 75 ml. of alcohol-ketal mixture per hour per 100 cc. of catalyst bed. The yield of allyl acetone based on allyl alcohol fed to the reactor was 30.6%.

EXAMPLES 2–14

The catalyst of Example 1 was used in a group of experiments in which ratio of reactants, feed rate, and temperature were varied independently while maintaining the other conditions constant to determine optimum conditions for the catalyst set forth in Example 1. These are shown in Table I along with the yield of allyl acetone which was based on the ketal fed except No. 2 which was based on alcohol fed.

Table I

| Example | Molar ratio (alcohol/ketal) | Feed rate (ml./hr./100 cc. catalyst) | Temp. (° C.) | Yield of allyl acetone (percent) |
| --- | --- | --- | --- | --- |
| 2 | 1/5 | 75 | 279 | 27.0 |
| 3 | 5/1 | 75 | 274 | 69.5 |
| 4 | 8/1 | 75 | 274 | 99.5 |
| 5 | 2/1 | 12.5 | 272 | 72.0 |
| 6 | 2/1 | 75 | 272 | 55.0 |
| 7 | 2/1 | 237.5 | 272 | 30.0 |
| 8 | 2/1 | 400 | 272 | 18.0 |
| 9 | 2/1 | 75 | 225 | 31.0 |
| 10 | 2/1 | 75 | 250 | 47.0 |
| 11 | 2/1 | 75 | 327 | 38.5 |
| 12 | 2/1 | 75 | 375 | 20.0 |

EXAMPLES 13–17

The same catalyst as employed in Example 1 was used in other experiments in which different ketals were reacted with allyl alcohol in a molar ratio of alcohol to ketal of 8 to 1 respectively, and at a feed rate of 75 ml./hr./100 cc. catalyst. The temperature of reaction was about 275° C. The results of these operations are given in Table II below. Yields of mono-allyl ketones are based on substantially complete conversion of ketal.

Table II

| Example | | Yield of allyl ketone (percent) |
| --- | --- | --- |
| 13 | Butanone dimethyl ketal | 47.6 |
| 14 | Acetone dibutyl ketal | 39.6 |
| 15 | 2,2,4-trimethyl-1,3-dioxolane | 22.0 |
| 16 | Cyclohexanone dimethyl ketal | 82.0 |
| 17 | Acetone methyl n-butyl ketal | 44.0 |

To illustrate the variety of catalysts which are operative in accordance with the present invention the oxides, halides, sulfates, and phosphates of various metals were also used as catalysts as well as some pure metals and salts of acids. These catalysts were prepared on various granular and pelleted supports in the manner of the following description:

Prior to the preparation of the catalyst, the quantity of water absorbed by a given weight of the support was determined. This volume of water was used to dissolve the compound to be placed on the support as the catalyst. The resulting solution was added slowly to the catalyst support with stirring. The wet mixture was then dried in an oven maintained at 120–130° C. for up to 10 to 15 hours. Oxide forms of metals used as catalysts were usually placed on the support as the nitrate salt of the metal and the nitrate subsequently decomposed to the oxide in a muffle furnace.

In a particular embodiment of this preparation, catalyst containing 5% by weight of barium phosphate was made. A weight of 6.6 g. of $Ba(NO_3)_2$ was dissolved in about 35 ml. of distilled water and this solution used to impregnate a pure granular alumina having an 8 to 15 mesh. The wet catalyst was placed in a muffle furnace at 400° C. for a period of 19 hours, after which it was allowed to cool. It was then re-impregnated with a dilute solution of phosphoric acid (prepared by diluting 8 ml. of concentrated acid to 35 ml. with water). The wet catalyst was placed in the muffle furnace at 400° C. for three and one-half hours and then cooled for use.

It is to be understood that if no water soluble compound of the desired catalyst material was available, the insoluble metal compound was usually dissolved in acid to make the nitrate or chloride. The acid solution of the compound was then used to impregnate the catalyst support and treated in some such manner as the above to give the desired catalyst.

The metallic catalysts were made by preparing the oxide of the metal on the catalyst support, followed by reduction to the metal form.

The following examples show the reaction of allyl alcohol with several different dimethyl ketals over various metallic catalysts: mixtures of (A) allyl alcohol with butanone dimethyl ketal and (C) allyl alcohol with cyclohexanone dimethyl ketal were passed separately over gold and cobalt catalysts, supported on pure alumina granules, prepared in the manner previously indicated. The molar ratio of alcohol to ketal was 8:1; the temperature of the catalyst bed was maintained at 290–300° C. and the feed rate of the mixture was 30 ml./hr. in (A) and 100 ml./hr. in (C) per 100 cc. of catalyst. Table III shows results.

Table III

| Example | Catalyst | Percent conversion | Percent yield [1] | Ratio mono/di [2] |
|---|---|---|---|---|
| 18 (A) | Gold | 92 | 57 | 1.72 |
| (C) | Gold | 49 | 83 | |
| 19 (A) | Cobalt | 60 | 62 | 0.88 |
| (C) | Cobalt | 70 | 74 | |

[1] The yield of allyl ketone in the above is based on the total amount of ketal converted to mono or di allylbutanone, i.e., unrecovered.
[2] The ratio of mono to di allyl butanone found on analysis.

EXAMPLE 20

A mixture of allyl alcohol and cyclohexanone dimethyl ketal in molar ratio of 15 to 1 was passed over a gold catalyst as in Example 18 (C) with the resulting conversion of the ketal being 78% and a yield of 67% 2-allylcyclohexanone being obtained.

EXAMPLES 21–31

Oxides of various metals were used as catalysts for the reaction (A) allyl alcohol with acetone dimethyl ketal, (B) allyl alcohol with butanone dimethyl ketal, and (C) allyl alcohol with cyclohexanone dimethyl ketal, respectively, at molar ratios of alcohol to ketal of 8 to 1. Results are shown in Table IV. Reaction (A) used a feed rate of 50 ml./hr./100 cc. of catalyst; reaction (B) used a feed rate of 30 ml./hr./100 cc. of catalyst, and reaction (C) used a feed rate of 100 ml./hr./100 cc. of catalyst. The temperature of the catalyst beds were (A) 272 to 278° C. and (B) and (C) 290–300° C. The yields reported hereinafter are total yields of all allylated ketones based on ketal consumed.

Table IV

| Ex. No. | Catalyst | Reaction (A) | | Reaction (B) | | Ratio [1] mono/di | Reaction (C) | |
|---|---|---|---|---|---|---|---|---|
| | | Conv. | Yield | Conv. | Yield | | Conv. | Yield |
| 23 | HgO | 99 | 76 | 98 | 62 | 0.19 | 72 | 60 |
| 24 | ZnO | 99 | 30 | | | | | |
| 25 | CdO | 99 | 23 | | | | | |
| 26 | $Cr_2O_3$ | 99 | 53 | 71 | 68 | 1.0 | 84 | 77 |
| 27 | $Cr_2O_3$ | 89 | [2] 74 | | | | | |
| 28 | $MoO_3$ | 99 | 27 | | | | | |
| 29 | $MnO_2$ | 99 | 50 | 70 | 47 | 0.81 | 66 | 56 |
| 30 | $ZrO_2$ | 99 | 27 | | | | | |
| 31 | $U_2O_5$ | 99 | 39 | | | | | |

[1] Ratio of monoallyl butanone to diallyl butanone.
[2] Reactants were fed in a molar ratio of 15 to 1 alcohol to ketal respectively and at a feed rate of 100 ml./hr./100 cc. of catalyst and a bed temperature of 290°–300° C.

EXAMPLES 32–54

In the following examples the halides and sulfates of various metals were employed in the manner of Examples 23–31 employing the same reactants and reaction conditions.

Table V

| Ex. No. | Catalyst | Reaction (A) | | Reaction (B) | | Ratio [1] mono/di | Reaction (C) | |
|---|---|---|---|---|---|---|---|---|
| | | Conv. | Yield | Conv. | Yield | | Conv. | Yield |
| 32 | $CuCl_2$ | 99 | 65 | 92 | 65 | 0.76 | 50 | 18 |
| 33 | AgCl | 99+ | 69 | | | | | |
| 34 | $BaCl_2$ | 99 | 65 | 93 | 59 | 0.60 | 87 | 40 |
| 35 | $CdCl_2$ | 99 | 69 | 100 | 77 | 0.83 | 93 | 80 |
| 36 | $CoCl_2$ | 99 | 65 | 96 | 65 | 1.17 | 85 | 69 |
| 37 | $FeCl_2$ | 99 | 57 | | | | | |
| 38 | $NiCl_2$ | 99 | 53 | | | | | |
| 39 | $LaCl_3$ | 100 | 65 | 89 | 74 | 0.77 | 84 | 77 |
| | | | | | | | 70 | [2] 91 |
| 40 | $AlF_3$ | 99 | [3] 60 | 94 | 53 | 0.43 | 84 | 88 |
| | | 99 | [4] 76 | | | | | |
| 41 | $ThCl_4$ | 99 | 58 | 90 | 62 | 0.82 | 76 | 56 |
| 42 | $CrCl_3$ | 99 | 61 | 96 | 70 | 1.06 | 90 | 76 |
| 43 | $ZrCl_4$ | 99 | 57 | 95 | 58 | 1.07 | 93 | 59 |
| 44 | $GdCl_3$ | 99 | 57 | 94 | 52 | 0.93 | 81 | 58 |
| 45 | $Na_2SO_4$ | 100 | 65 | | | | | |
| 46 | $K_2SO_4$ | 100 | 76 | | | | | |
| 47 | $MgSO_4$ | 99 | 23 | 96 | 63 | 0.66 | 84 | 65 |
| 48 | $La_2(SO_4)_3$ | 99 | 15 | 99 | 100 | 1.38 | 92 | 68 |
| 49 | $Gd_2(SO_4)_3$ | 99 | 57 | 68 | 57 | 0.46 | 89 | 86 |
| 50 | $Zr(SO_4)_2$ | 99 | 34 | 93 | 81 | 0.42 | 87 | 65 |
| 51 | $Sb_2(SO_4)_3$ | 99 | 65 | 90 | 20 | 0.18 | 48 | 57 |
| 52 | $MnSO_4$ | 99 | 58 | 97 | 46 | 0.92 | 88 | 64 |
| 53 | $NiSO_4$ | 99 | 53 | 93 | 36 | 0.57 | 89 | 75 |
| 54 | $La_2(SO_4)_3$ [5] | 97 | 74 | | | | | |

[1] Ratio of monoallyl butanone to diallyl butanone.
[2] 15:1 molar proportion of alcohol to ketal.
[3] Clay-alumina support.
[4] Alumina support treated with HF acid; heated 400° C. for 1 hour.
[5] 15:1 molar proportion alcohol to ketone; 100 ml./hr./100 cc. feed rate. 290°–300° C.

EXAMPLES 55–77

Various metal phosphates were prepared on a pure alumina catalyst support and, as in the preceding examples, reactions A, B and C were run to determine the activity of these catalysts. Table VI shows the catalysts used and the results.

Table VI

| Ex. No. | Catalyst | Reaction (A) Conv. | Reaction (A) Yield | Reaction (B) Conv. | Reaction (B) Yield | Ratio [1] mono/di | Reaction (C) Conv. | Reaction (C) Yield |
|---|---|---|---|---|---|---|---|---|
| 55 | $Li_3PO_4$ | 100 | 88 | | | | | |
| 56 | $K_3PO_4$ | | | 95 | 33 | 0.94 | 85 | 42 |
| 57 | $Na_3PO_4$ | 99 | 19 | | | | | |
| 58 | $Ag_3PO_4$ | 99 | 38 | | | | | |
| 59 | $Be_3(PO_4)_2$ | 99 | 57 | | | | | |
| 60 | $Mg_3(PO_4)_2$ | 99 | 84 | | | | | |
| 61 | $Ca_3(PO_4)_2$ | 99 | 65 | | | | | |
| 62 | $Ba_3(PO_4)_2$ | 99 | 76 | 92 | 62 | 0.38 | 93 | 80 |
| 63 | $Ba_3(PO_4)_2$ [2] | | | | | | 85 | 63 |
| 64 | $SrHPO_4$ | 99 | 65 | | | | | |
| 65 | $LaPO_4$ | 99 | 88 | 97 | 70 | 0.71 | 90 | 80 |
| 66 | $CePO_4$ | 99 | 57 | | | | | |
| 67 | $Th(PO_3)_4$ | 99 | 72 | 100 | 69 | 0.63 | 91 | 78 |
| 68 | $AlPO_4$ [3] | 99 | 49 | | | | | |
| 69 | $AlPO_4$ [4] | 99 | 65 | | | | | |
| 70 | $TlPO_4$ | 99 | 50 | | | | | |
| 71 | $TiO_2 \cdot Ti_3(PO_4)_2$ | 99 | 76 | | | | | |
| 72 | $Zr_3(PO_4)_4$ | 99 | 65 | 95 | 60 | 0.67 | 84 | 60 |
| 73 | $SnPO_4$ | 99 | 50 | | | | | |
| 74 | $CrPO_4$ | 99 | 65 | 95 | 81 | 0.72 | 91 | 76 |
| 75 | $MnPO_4$ | 99 | 57 | 100 | 53 | 0.56 | 94 | 56 |
| 76 | $FePO_4$ | 99 | 72 | 93 | 59 | 0.64 | 85 | 49 |
| 77 | $GdPO_4$ | 99 | 72 | 98 | 70 | 0.67 | 93 | 70 |

[1] Ratio of monoallyl butanone to diallyl butanone.
[2] Reaction C run at 15:1 molar proportions.
[3] This catalyst was unsupported and consisted of granular $AlPO_4$.
[4] This catalyst was prepared by treating the pure alumina support with $H_3PO_4$.

EXAMPLES 78–82

Various salts as well as acid-treated catalyst supports were employed as catalyst for reaction (A) as defined hereinbefore. The results are shown in Table VII following. In each experiment the conversion of ketal was substantially quantitative.

Table VII

| Example No. | Catalyst | Yield |
|---|---|---|
| 78 | Alumina treated with $H_3BO_3$ | 46 |
| 79 | Alumina treated with $H_2UO_2PO_4$ | 65 |
| 80 | $UO_2(SO_4)_3$ | 50 |
| 81 | $U(OH)PO_4$ | 57 |
| 82 | $CaWO_4$ | 72 |

The preceding examples are given for purposes of illustration and are not to be construed as limiting the scope of our invention, which is set out in the following claim.

The starting reactants can be obtained in the manner of Serial No. 799,399, filed March 2, 1959, by Nicholas B. Lorette and William L. Howard, now abandoned and refiled as Serial No. 105,260 on April 25, 1961.

We claim:

A process for preparing alpha-allyl substituted ketones by reacting by contacting in the vapor phase at a temperature of from about 175° C. to about 475° C. allyl alcohol with a dialkyl ketal derived from a ketone selected from the group consisting of alkanones having from three to eight carbon atoms and cycloalkanones having from 5 to 6 membered carbon rings, and containing at least one hydrogen atom on a carbon adjacent to the carbonyl group, in the presence of a catalyst selected from the group consisting of calcium-nickel phosphate, gold (Au), silver (Ag), platinum (Pt), cobalt (Co), nickel (Ni), chromic oxide ($Cr_2O_3$), manganese dioxide ($MnO_2$), cadmium chloride ($CdCl_2$), xirconium chloride ($ZrCl_4$), antimony trichloride ($SbCl_3$), chromic chloride ($CrCl_3$), aluminum fluoride ($AlF_3$), lanthanum sulfate ($La_2(SO_4)_3$), gadolinium sulfate ($Gd_2(SO_4)_3$), thorium sulfate ($Th(SO_4)_2$), aluminum sulfate ($Al_2(SO_4)_3$), thallium sulfate ($Tl_2(SO_4)_3$), zirconium sulfate ($Zr(SO_4)_2$), antimony sulfate ($Sb(SO_4)_3$), maganous sulfate ($MnSO_4$), nickel sulfate ($NiSO_4$), silver phosphate ($Ag_3PO_4$), cadmium phosphate ($Cd_3(PO_4)_2$), lathanum phosphate ($LaPO_4$), cerous phosphate ($CePO_4$), thorium phosphate $$Th(PO_3)_4$$

aluminum phosphate ($AlPO_4$), thallium phosphate $$TlPO_4$$

chromic phosphate ($CrPO_4$), manganic phosphate $$MnPO_4$$

ferric phosphate ($Fe_3PO_4$), gadolinium phosphate $$GdPO_4$$

mercuric oxide (HgO), zinc oxide (ZnO), cadmium oxide (CdO), molybdenum trioxide ($MoO_3$), thorium chloride ($ThCl_4$), zirconium dioxide ($ZrO_2$), uranium oxide $$U_2O_5$$

cupric chloride ($CuCl_2$), silver chloride (AgCl), barium chloride ($BaCl_2$), cobaltous chloride ($CoCl_2$), ferrous chloride ($FeCl_2$), nickel chloride ($NiCl_2$), lanthanum chloride ($LaCl_3$), gadolinum chloride ($GdCl_3$), sodium sulfate ($Na_2SO_4$), potassium sulfate ($K_2SO_4$), magnesium sulfate ($MgSO_4$), lithium phosphate ($Li_3PO_4$), potassium phosphate ($K_3PO_4$), sodium phosphate ($Na_3PO_4$), beryllium phosphate ($Be_3(PO_4)_2$), magnesium phosphate ($Mg_3(PO_4)_2$), calcium phosphate ($Ca_3(PO_4)_2$), barium phosphate ($Ba_3(PO_4)_2$), strontium phosphate ($SrHPO_4$), $TiO_2 \cdot Ti_3(PO_4)_2$, zirconium phosphate ($Zr_3(PO_4)_4$), alumina treated with $H_3BO_3$, alumina treated with $$H_2UO_2PO_4$$

$UO_2(SO_4)_3$ and $U(OH)PO_4$.

References Cited by the Examiner

UNITED STATES PATENTS

3,029,287  4/62  Morbet et al. _____ 260—563

FOREIGN PATENTS

679,792  7/39  Germany.

OTHER REFERENCES

Nazarov et al.: C. A., volume 53, pages 1123–1124 (1959).

LORRAINE A. WEINBERGER, *Acting Primary Examiner.*

LEON ZITVER, *Examiner.*